Figure 1:
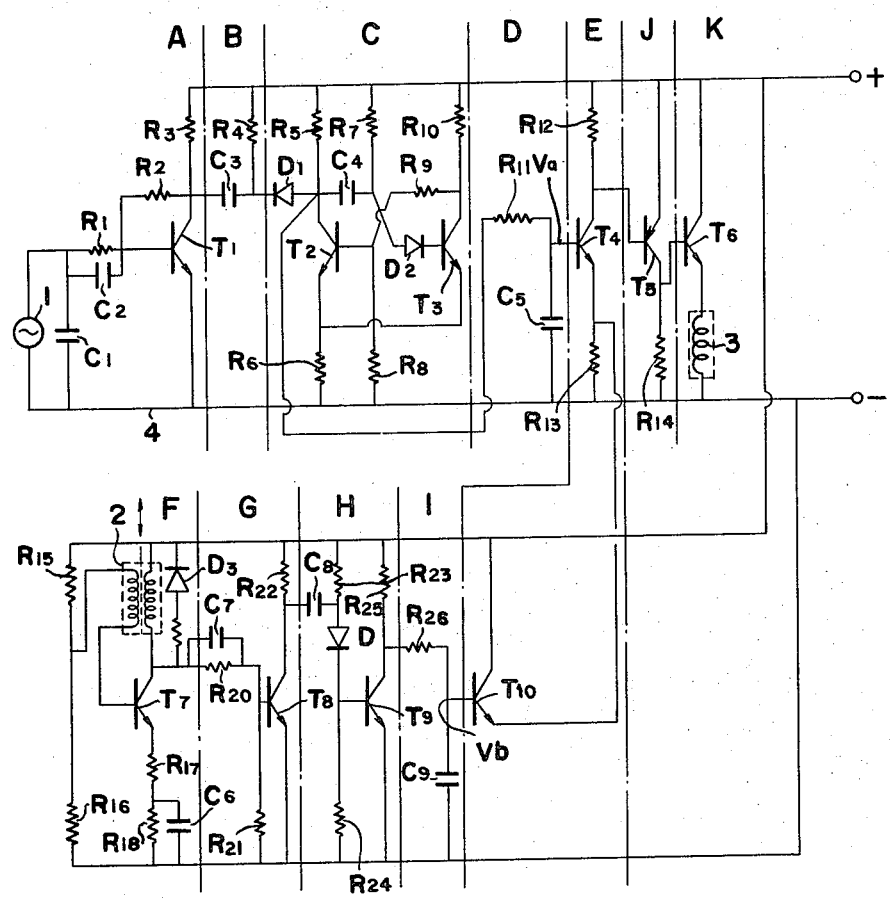

United States Patent
Tada et al.

[15] 3,695,242
[45] Oct. 3, 1972

[54] ELECTRONIC GOVERNOR FOR FUEL-INJECTION TYPE INTERNAL COMBUSTION ENGINES

[72] Inventors: Yoshiharu Tada; Minoru Sawada, both of Higashi-Matsuyama, Japan

[73] Assignee: Diesel Kiki Kabushiki Kaisha, Tokyo, Japan

[22] Filed: Aug. 5, 1970

[21] Appl. No.: 61,087

[30] Foreign Application Priority Data

Sept. 4, 1969 Japan ...................... 44/83640

[52] U.S. Cl. .............................. 123/102, 123/139 E
[51] Int. Cl. .............................................. F02m 51/00
[58] Field of Search ............ 123/97, 102, 118, 32 EA

[56] References Cited
UNITED STATES PATENTS

| | | | |
|---|---|---|---|
| 3,575,256 | 4/1971 | Jania et al. | 123/102 |
| 3,153,746 | 10/1964 | Atkinson | 123/102 X |
| 3,407,793 | 10/1968 | Lang | 123/102 |
| 3,425,401 | 2/1969 | Lang | 123/102 |
| 3,525,017 | 8/1970 | Rosenberg et al. | 123/102 X |

Primary Examiner—Laurence M. Goodridge
Attorney—Larson, Taylor and Hinds

[57] ABSTRACT

An electronic governor for fuel-injection type internal combustion engines in which an output voltage inversely proportional to a rotation speed of engine and an output voltage of a blocking oscillator correlated to a position of an accelerator lever of the engine are applied to a differential amplifying circuit whose output is connected to an electromagnetic fuel control mechanism actuating a fuel regulating rod.

1 Claim, 2 Drawing Figures

ELECTRONIC GOVERNOR FOR FUEL-INJECTION TYPE INTERNAL COMBUSTION ENGINES

This invention relates to an electronic governor for fuel-infection type internal combustion engines.

In conventional electronic circuits for governors of this type, the output signal of a fixed-frequency oscillator is applied to an AC bridge circuit comprising resistors, inductance and variable inductance whose value varies with the position of an accelerator lever of engine, so that an AC output voltage of the bridge is of a fixed-frequency with its peak value being determined by the variable inductance value corresponding to the position of the accelerator lever, and a DC voltage is produced by integrating this AC output voltage of the bridge. The DC voltage is then compared against another DC voltage proportional to the rotation speed of the engine, and an electromagnetic mechanism for controlling a fuel regulating rod, by which the fuel injection quantity delivered by a fuel injection pump is increased or decreased, is operated according to the magnitude of the difference between said two DC voltages. The oscillator in such a circuit is a main circuit component and may take any of many known forms. But, no matter what form the oscillator may take, it is not free from the effects of changes in ambient temperature and its frequency changes more or less when a temperature change occurs. Moreover, conventional electronic circuits use an AC bridge circuit, whose resistance and inductance elements vary their values for an ambient temperature variation occurring between the cold state of the engine at the time of starting and the hot state of the engine in normal operation, and also between seasons of the year. When resistance or inductance value changes even slightly, the output voltage of the bridge changes widely. These are the drawbacks of the conventional circuits hitherto used for electronic governors.

The object of this invention is to provide an electronic governor circuit in which no AC bridge is used and which is designed with the use of a blocking oscillator less subject to the effects of temperature variation in order to avoid such drawbacks as are associated with conventional circuits.

Figure 2:
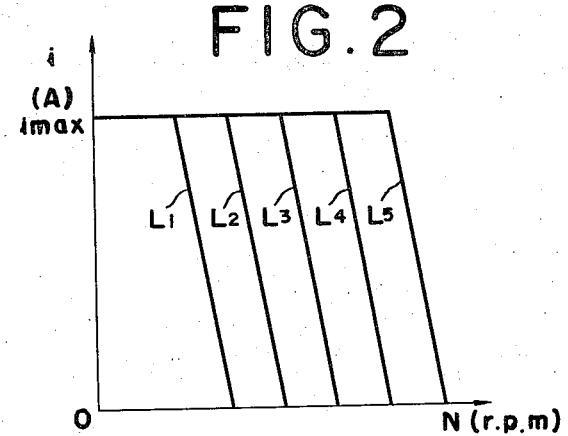

The invention will be made clear by the following description of an embodiment thereof in reference to the accompanying drawings in which:

FIG. 1 shows an embodiment of an electronic circuit for the governor according to the invention; and FIG. 2 is a graph showing the output characteristics of the electronic circuit of FIG. 1.

In FIG. 1, a rotation speed detector is shown at 1. This detector is coupled to a rotating shaft of the fuel injection pump and detects the rotation speed electromagnetically. Such devices are, of course, conventional and produce an output voltage corresponding to the rotational speed of the shaft of the fuel injection pump. A variable inductance, associated in such a way with the accelerator lever of the engine as to vary its inductance value according to the position of this lever, is designated at 2. As the accelerator lever is moved in the direction for increasing injection quantity, the core within the inductance 2 moves outwardly to vary the inductance value of the coil. At 3 is shown a movable coil of a control mechanism which moves the regulating rod of the fuel injection pump in response to the output current of the electronic circuit. A negative conductor is shown at 4. This conductor is connected to the negative side of a battery, not shown, of the engine. A positive conductor is shown at 5. This conductor is connected to the positive side of the same battery. Transistors are designated at $T_1$ through $T_{10}$; diodes at $D_1$ through $D_4$; capacitors at $C_1$ through $C_9$; and resistors at $R_1$ through $R_{26}$.

Referring to the same FIG. 1, the signal produced by the rotation speed detector and corresponding to the rotation speed of the fuel injection pump is amplified by an amplifying circuit A comprising transistor $T_1$, resistors $R_1$, $R_2$ and $R_3$, and capacitor $C_1$ and $C_2$ and the output signal of the amplifier A is then differentiated and changed to a trigger pulse by a differentiating circuit B of known type having capacitor $C_3$ and resistor $R_4$. The trigger pulse is applied through diode $D_1$ to a monostable multivibrator C of known type having transistors $T_2$, $T_3$, $T_4$ and $T_5$, diode $D_2$, capacitor $C_4$, and resistors $R_5$ through $R_{10}$. The diode $D_1$ eliminates positive pulses from the passing signal so that only negative pulses enter the monostable multivibrator C. This multivibrator supplies its output voltage from the collector side of its transistor $T_2$ to an integrating circuit D of known type having resistor $R_{11}$ and capacitor $C_5$, by which the multivibrator output signal is converted to a DC voltage $V_a$, whose value is determined by following formula:

$$V_a - V(1 - kt_1 N) \qquad 1$$

where $t_1$ is the pulse width determined by the time constant of capacitor $C_4$ and resistor $R_7$ in the monostable multivibrator C, $V$ is the peak value of multivibrator output signal, $N$ is the rotation speed of the fuel injection pump (that is, of the engine), and $k$ is a constant. The formula 1 above tells that, if the rotation speed $N$ increases, the value of $V_a$ decreases. This voltage $V_a$ is applied to the base of transistor $T_4$ in a differential amplifier circuit E (which may be a voltage comparator circuit) having transistors $T_4$ and $T_{10}$ and resistors $R_{12}$ and $R_{13}$.

A blocking oscillator F of known type composed of transistor $T_7$, capacitor $C_6$, diode $D_3$, resistors $R_{15}$ through $R_{19}$ and variable inductance 2 oscillates at frequency corresponding to the various values of variable inductance 2. The output signal of this oscillator F is fed to an amplifying circuit C having transistor $T_8$, capacitor $C_7$ and resistors $R_{20}$ through $R_{22}$, and is by this amplifier G converted to a square waveform, which is then led to a monostable multivibrator H of known type composed of transistor $T_9$, diode $D_4$, capacitor $C_8$ and resistors $R_{23}$ through $R_{25}$. The output signal of this multivibrator H is a square waveform signal with a constant pulse width and is applied to an integrating circuit I of known type having resistor $R_{26}$ and capacitor $C_9$. By integration, the square waveform signal with a constant pulse width is converted to a DC voltage $V_b$, whose value is given by following formula:

$$V_b - V \cdot t_2 \cdot f \qquad 2$$

where $t_2$ is the pulse width determined by the time constant of capacitor $C_8$ and resistor $R_{23}$, $V$ is the peak value of multivibrator output signal, and $f$ is the oscillating frequency of oscillator F. The DC voltage $V_b$ is applied to the base of transistor $T_{10}$ in the differential amplifier E mentioned above.

Thus, the degree of the conduction of transistor $T_4$ in the differential amplifier circuit E varies according to the difference between these two voltages $V_a$ and $V_b$ which may be expressed by equations 1 and 2 above. Stated specifically, the greater the difference $V_a - V_b$, the more conductive becomes transistor $T_4$; as the difference diminishes, transistor $T_4$ becomes less conductive; and when $V_a$ is equal to $V_b$, transistor $T_4$ becomes non-conductive. The output of this transistor $T_4$ is amplified at an amplifying circuit J comprising the transistor $T_5$ and resistor $R_{14}$. The output of the circuit J is connected to a power amplifying circuit K comprising the transistor $T_6$ and the movable coil 3. Current $i$ that flows in movable coil 3 varies in response to the rotation speed N of the engine and also to the value of variable inductance 2 which may be indicated, for instance, as $L_1, L_2 \ldots L_5$ ($L_1 > L_2 \ldots$). In the graph of FIG. 2, these values of inductance are shown as parameters on characteristic curves representing current $i$, taken on the vertical axis, engine rotation speed N, taken on the horizontal axis. Inductance L varies with the position of said accelerator lever. Current $i_{max}$, indicated in FIG. 2, is equal to the value given by dividing the maximum voltage applying to the movable coil 3 by the internal resistance thereof. This coil may be placed within a magnetic field of a magnetic-pole cylinder in a known manner and subjected to electromagnetic force whose direction is governed by Fleming's left-hand rule. The force acting on the coil is transmitted through a linkage to the regulating rod of the fuel injection pump not shown, which, by moving, increases or decreases the fuel injection quantity delivered by the injection pump. It follows therefore that the current $i_{max}$ determines the position of the fuel regulating rod for the maximum fuel injection quantity.

The foregoing electronic circuit preforms the speed governing action in the following manner: Assuming that the fuel regulating rod is so arranged that it will move against the force of a spring in the direction for increasing injection quantity when a current flowing through the movable coil 3 increases, and if the load being carried by the engine decreases. This load reduction raises engine speed to lower the output voltage $V_a$ of integrating circuit D, thereby decreasing the output voltage of power amplifying circuit K and reducing the magnitude of electromagnetic force acting on coil 3. By this reduction of force on coil 3, the spring-urged regulating rod shifts in the direction for decreasing injection quantity. If the rotation speed of the engine slows down, the force acting on the movable coil 3 increases to move the regulating rod against the force of its spring in the direction for increasing fuel injection quantity.

Moving the accelerator lever, on the other hand, in order to increase the fuel injection quantity will lower the oscillating frequency of blocking oscillator F, so that the output voltage $V_b$ of integrating circuit I falls to raise the output voltage of differential amplifying circuit E, thereby raising the output voltage of power amplifying circuit K. This raised output voltage causes the coil 3 to move the regulating rod in the direction for increasing the quantity of fuel injected. Moving the accelerator lever back to its original position reverses the above series of events to allow the regulating rod to be forced back by its urging spring in the direction for decreasing fuel injection quantity. For each of different positions that the accelerator lever can be moved to take, the governor action described in the preceding paragraph takes place, for a change in engine load, to vary the coil current $i$, as illustrated in FIG. 2.

It will be seen from the foregoing description that the advantages of an electronic circuit according to this invention lies in its simple construction due to a minimum number of circuit elements required and also in a stable governor action due to the use of a blocking oscillator, which is little affected by changes in ambient temperature and provides a stable frequency of oscillation.

While the invention has been described in detail with respect to embodiment of the invention it will be understood that various changes and modifications may be made without departing from the spirit and scope of the invention, and it is intended, therefore, to cover all such changes and modifications in the appended claim.

What is claimed is:

1. An electronic governor for a fuel-injection internal combustion engine comprising: means for producing an electrical output signal in accordance with the rotational speed of the engine fuel pump; amplifier means for amplifying said signal; differentiator circuit means connected to the output of said amplifier means for differentiating the amplified signal; detector means connected to the output of said differentiator means; first monostable multivibrator means connected to the output of said detector means; first integrator circuit means for integrating the output signal produced by said first monostable multivibrator means; blocking oscillator means, including a variable impedance means the impedance value of which is a function of the position of the engine accelerator operating lever, for producing an output signal having a frequency which is a function of the position of said operating lever; second amplifier means for amplifying the output of said blocking oscillator means; second monostable multivibrator means connected to the output of said second amplifier means; second integrator circuit means for integrating the output signal produced by said second monostable multivibrator means; differential amplifier means having a first input connected to the output of said first integrator circuit means and a second input connected to the output of said second integrator circuit means; further amplifier means connected to the output of said differential amplifier means; power amplifier means connected to the output of said further amplifier means; and electromagnetic control means connected to the output of said power amplifier means for controlling actuation of a fuel regulating control rod.

* * * * *